(12) United States Patent
Azuma et al.

(10) Patent No.: US 11,674,593 B2
(45) Date of Patent: Jun. 13, 2023

(54) WORKING VEHICLE

(71) Applicant: KUBOTA CORPORATION, Osaka (JP)

(72) Inventors: Hitoshi Azuma, Osaka (JP); Michita Kono, Osaka (JP); Hiroshi Sota, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/496,333

(22) Filed: Oct. 7, 2021

(65) Prior Publication Data

US 2022/0112950 A1 Apr. 14, 2022

(30) Foreign Application Priority Data

Oct. 13, 2020 (JP) .............................. JP2020-172798

(51) Int. Cl.
| | |
|---|---|
| *F16H 61/16* | (2006.01) |
| *F16H 59/36* | (2006.01) |
| *F16H 61/32* | (2006.01) |
| *F16H 3/00* | (2006.01) |

(52) U.S. Cl.
CPC ............. *F16H 61/16* (2013.01); *F16H 59/36* (2013.01); *F16H 61/32* (2013.01); *F16H 2003/008* (2013.01); *F16H 2306/24* (2013.01)

(58) Field of Classification Search
CPC .......................... F16H 61/16–2061/168; F16H 59/44–2059/446; F16H 2306/24
See application file for complete search history.

(56) References Cited

U.S. PATENT DOCUMENTS

| | | | | |
|---|---|---|---|---|
| 5,429,559 | A * | 7/1995 | Steeby | F16H 61/702 |
| | | | | 477/80 |
| 6,385,520 | B1 * | 5/2002 | Jain | F16H 61/061 |
| | | | | 701/58 |
| 2016/0167647 | A1 * | 6/2016 | Yamada | B60W 30/02 |
| | | | | 701/50 |
| 2018/0031119 | A1 * | 2/2018 | Maurer | F16H 61/0213 |

FOREIGN PATENT DOCUMENTS

| | | |
|---|---|---|
| EP | 0 644 362 A1 | 3/1995 |
| JP | 2019-006209 A | 1/2019 |

* cited by examiner

*Primary Examiner* — David R Morris
(74) *Attorney, Agent, or Firm* — Greenblum & Bernstein, P.L.C.

(57) ABSTRACT

A working vehicle includes: a vehicle body; a linkage device configured to link a working device to the vehicle body; a prime mover provided on the vehicle body; a traveling device configured to cause the vehicle body to travel; a transmission device configured to transmit power from the prime mover to the traveling device and perform a speed change process to change a speed of the vehicle body; an increase-in-speed detection device configured to detect an increase in speed of the vehicle body; and a speed change restraint unit configured such that, during the speed change process performed by the transmission device, when the increase in speed detected by the increase-in-speed detection device has become equal to or greater than a threshold, the speed change restraint unit stops the speed change process performed by the transmission device.

12 Claims, 4 Drawing Sheets

WORKING VEHICLE

CROSS REFERENCE TO RELATED APPLICATIONS

This application claims the benefit of priority to Japanese Patent Application No. 2020-172798 filed on Oct. 13, 2020. The entire contents of this application are hereby incorporated herein by reference.

BACKGROUND OF THE INVENTION

Field of the Invention

The present invention relates to a working vehicle such as a tractor.

Description of the Related Art

Japanese Unexamined Patent Publication No. 2019-6209 (Patent document 1) is known as a tractor which includes transmissions (transmission devices) such as a main transmission and an auxiliary transmission.

In a working vehicle of Patent document 1, the auxiliary transmission device is configured to change speed stages via a shifter, and speed change can be achieved by allowing the shifter to engage with a rotating body which is rotating.

SUMMARY OF THE INVENTION

In the case where an operator changes speed by operating a speed-change lever or the like in the working vehicle as in Patent document 1, it may take time to connect the shifter, which may make the working vehicle unable to travel in a stable manner.

In view of such circumstances, an object of the present invention is to provide a working vehicle capable of traveling in a stable manner even at the time of speed change.

A working vehicle according to an aspect of the present invention comprises: a vehicle body; a linkage device configured to link a working device to the vehicle body; a prime mover provided on the vehicle body; a traveling device configured to cause the vehicle body to travel; a transmission device configured to transmit power from the prime mover to the traveling device and perform a speed change process to change a speed of the vehicle body; an increase-in-speed detection device configured to detect an increase in speed of the vehicle body; and a speed change restraint unit configured such that, during the speed change process performed by the transmission device, when the increase in speed detected by the increase-in-speed detection device has become equal to or greater than a threshold, the speed change restraint unit stops the speed change process performed by the transmission device.

The speed change restraint unit is configured such that, when the speed change process performed by the transmission device is a speed change process to reduce the speed of the vehicle body and the increase in speed after a start of the speed change process has become equal to or greater than the threshold, the speed change restraint unit stops the speed change process.

The increase-in-speed detection device is configured to calculate, as the increase in speed, a difference in vehicle speed between a speed of the vehicle body at the start of the speed change process and a current speed of the vehicle body after the start of the speed change process.

The transmission device includes a device configured to select a speed stage among multiple speed stages by movement of a shifter; and the speed change restraint unit is configured to stop the speed change process by moving a linkage member in a direction opposite to a direction in which the linkage member has been moved by the movement of the shifter, the linkage member being a member linked to the shifter.

The linkage member is shiftable among a first position for maintaining the shifter in a neutral position, a second position for maintaining the shifter in a first slowdown position, and a third position for maintaining the shifter in a second slowdown position; and the speed change restraint unit includes a movement mechanism configured to: move the linkage member from the second position to the first position when the shifter is in the first slowdown position; and move the linkage member from the third position to the first position when the shifter is in the second slowdown position.

The movement mechanism is shiftable among a stop position, one position, and another position on the opposite side of the stop position from the one position, the stop position corresponding to the first position of the linkage member, the one position corresponding to the second position of the linkage member, the other position corresponding to the third position of the linkage member; and the speed change restraint unit includes: a solenoid valve configured to shift the movement mechanism to the stop position, the one position, or the other position using hydraulic fluid; and a control device configured or programmed to control the solenoid valve.

The control device is configured or programmed such that, when the increase in speed after the start of the speed change process has become equal to or greater than the threshold, the control device controls the solenoid valve to move the movement mechanism to the stop position.

The speed change restraint unit is configured such that, when the increase in speed has become equal to or greater than the threshold, the speed change restraint unit stops the speed change process performed by the transmission device and then changes a speed stage of the transmission device back to a speed stage before the start of the speed change process.

The transmission device includes an auxiliary transmission unit configured to select one of multiple speed stages.

With the present invention, when vehicle speed increases during a speed change process, the speed change process is canceled. This makes it possible to eliminate or reduce the likelihood that the travel of a working vehicle will become unstable at the time of speed change.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses an embodiment of the present invention with reference to drawings.

Figure 4:
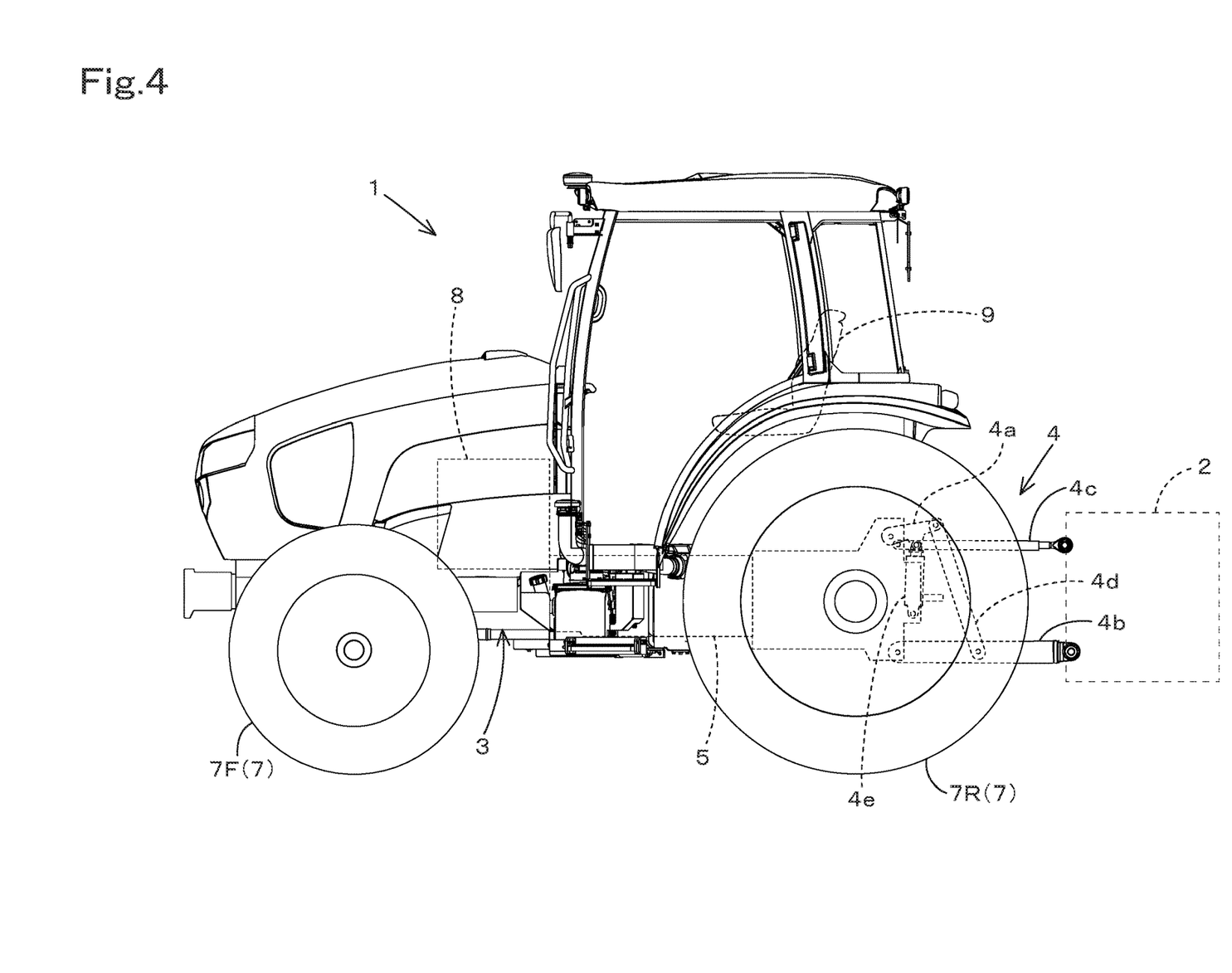
FIG. 4 is a side view of a working vehicle.

FIG. 4 is a side view of an embodiment of a working vehicle 1. In the present embodiment, the working vehicle 1 is a tractor. Note, however, that the working vehicle 1 is not limited to a tractor, and may be an agricultural machine (agricultural vehicle) such as a combine or a transplanting machine, a construction machine (construction vehicle) such as a loader working machine, or the like.

The following description is based on the assumption that the front end of the tractor (working vehicle) 1 as viewed from an operator seated on an operator's seat 9 is "front" or "forward", that the rear end of the tractor 1 as viewed from the operator is "rear" or "rearward", that the left side of the tractor 1 as viewed from the operator is "left" or "leftward", and that the right side of the tractor 1 as viewed from the operator is "right" or "rightward". The following description is also based on the assumption that a horizontal direction orthogonal to a front-rear direction of the working vehicle 1 is "vehicle-width direction" (width direction of vehicle body).

As illustrated in FIG. 4, the tractor 1 includes a vehicle body 3, a linkage device 4, a transmission device 5, and a prime mover 8. The vehicle body 3 has a traveling device 7 and is configured to travel. The traveling device 7 is a device that includes front wheels 7F and rear wheels 7R. The front wheels 7F may be tire-type wheels or a crawler-type wheels. The rear wheels 7R may also be tire-type wheels or crawler-type wheels.

The prime mover 8 is a diesel engine, an electric motor, or the like. In the present embodiment, the prime mover 8 is composed of a diesel engine. The transmission device 5 is configured to change driving forces for the traveling device 7 by performing a speed change process, and is configured to switch the traveling device 7 to a forward traveling state and to a rearward traveling state. The vehicle body 3 is provided with the operator's seat 9.

The linkage device 4 is provided at the rear of the vehicle body 3. The linkage device 4 is a device which links, to the rear of the tractor 1, a working device (ground working machine, implement) 2 which performs work on an agricultural field (agricultural land) or the like. The working device 2 is a cultivator for cultivation, a fertilizer applicator for applying fertilizer, a pesticide applicator for applying pesticide, a harvester for harvesting, a mower for mowing grass or the like, a tedder for tedding grass or the like, a rake for raking grass or the like, a baler for shaping grass or the like, a trailer, or the like.

The linkage device 4 also serves as, for example, a lifting and lowering device which is driven by an actuator such as a hydraulic cylinder to lift or lower the working device 2 (hereinafter may be referred to as "lifting and lowering device 4"). In the present embodiment, the lifting and lowering device 4 is composed of a three-point linkage, and includes a lift arm 4a, a lower link 4b, a top link 4c, a lift rod 4d, and a lift cylinder 4e. The top link 4c and the lift rod 4d are configured to be linked to the working device 2. The working device 2 is configured to be lifted and lowered through the expansion and contraction of the lift cylinder 4e. The linkage device 4 is not limited to the above-described embodiment, and may be composed of, for example, a swing drawbar that pulls the working device 2.

Figure 1:
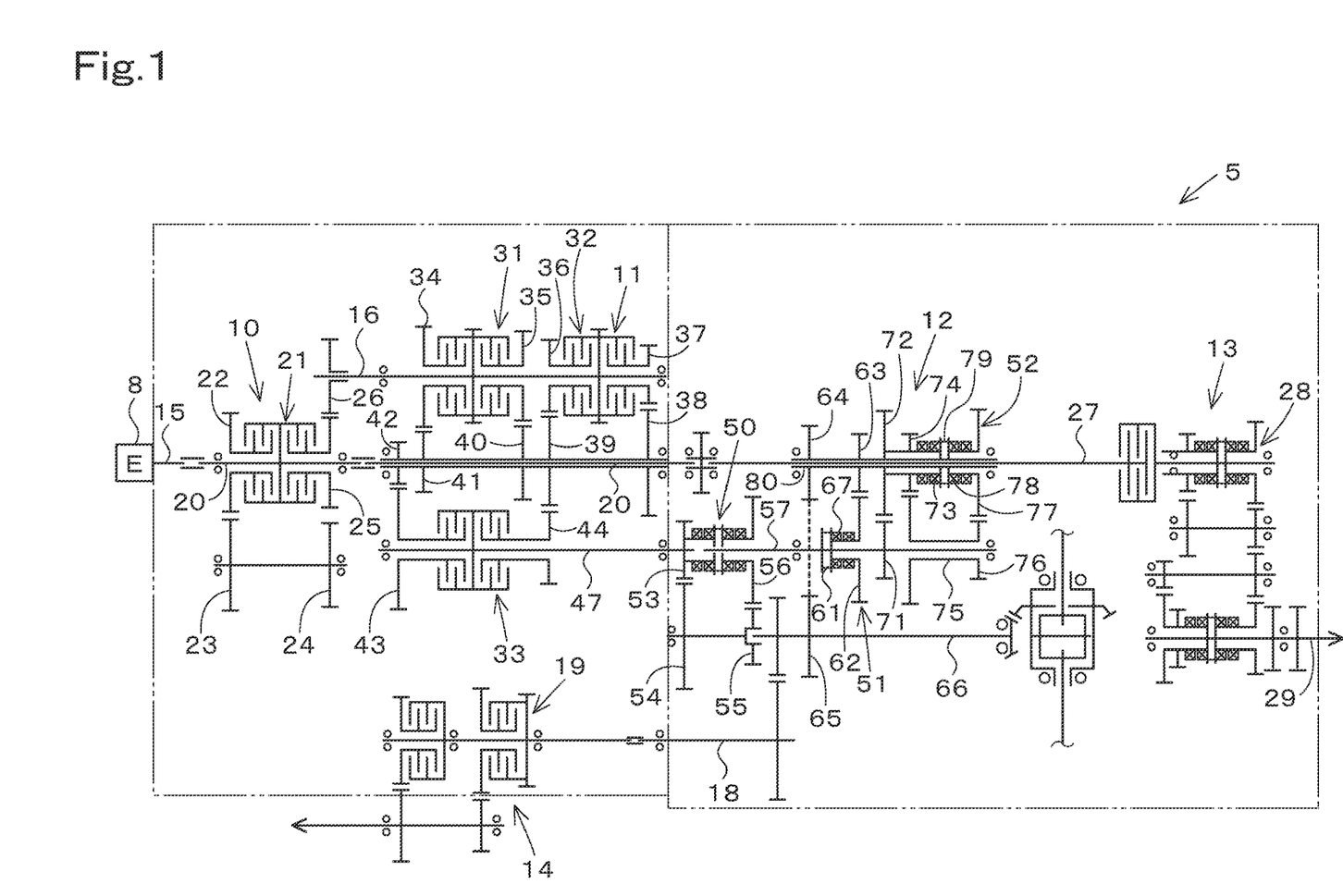
FIG. 1 illustrates a transmission device.

As illustrated in FIG. 1, the transmission device 5 includes a travel forward/reverse switching unit 10, a main transmission unit 11, an auxiliary transmission unit 12, a PTO power transmission unit 13, and a front wheel power transmission unit 14.

The travel forward/reverse switching unit 10 is a device that switches the direction of power transmitted from a crankshaft 15 of the prime mover 8 to a drive shaft 16 of a traveling system, i.e., the direction of rotation of the drive shaft 16, to the direction of normal rotation (forward) or the direction of reverse rotation (reverse). The travel forward/reverse switching unit 10 includes: a transmission shaft 20 that rotates as the crankshaft 15 rotates; a hydraulic clutch 21 that is shiftable between forward and reverse positions under hydraulic pressure; and a plurality of gears 22, 23, 24, and 25. When the hydraulic clutch 21 is in the forward position, power from the transmission shaft 20 is transmitted to the drive shaft 16 via the gears 25 and 26. When the hydraulic clutch 21 is in the reverse position, power from the transmission shaft 20 is transmitted to the drive shaft 16 via the gears 22, 23, 24, 25, and 26.

The main transmission unit 11 is a transmission unit that receives the power from the drive shaft 16 to change speed stages. The main transmission unit 11 includes a first main switching unit 31, a second main switching unit 32, a third main switching unit 33, and a plurality of gears 34 to 44. Since the gears 34 to 44 differ in outside shape, the power transmitted by the gears 34 to 44 can be switched between different speed stages. Specifically, the power transmitted by the gears 34 to 41 is switched to any of the first to fourth stages, and the power transmitted by the gears 39 and 42 to 44 is switched to the first or second stage.

The first main switching unit 31, the second main switching unit 32, and the third main switching unit 33 are each a hydraulic clutch that is shiftable among at least two opposite positions. When the first main switching unit 31 is in one of the opposite positions, the power from the drive shaft 16 is transmitted via the gears 34 and 41 to the gear 43 meshing with the gear 42 and to the gear 44 meshing with the gear 39. When the first main switching unit 31 is in the other of the opposite positions, the power from the drive shaft 16 is transmitted to the gear 43 via the gears 35, 40, and 42 and to the gear 44 via the gears 35, 40, and 39.

When the second main switching unit 32 is in one of the opposite positions, the power from the drive shaft 16 is transmitted to the gear 44 via the gears 36 and 39 and to the gear 43 via the gears 36, 39, and 42. When the second main switching unit 32 is in the other of the opposite positions, the power from the drive shaft 16 is transmitted to the gear 43 via the gears 37, 38, and 42 and to the gear 44 via the gears 37, 38, and 39.

When the third main switching unit 33 is in one of the opposite positions, the power transmitted to the gear 43 is transmitted to a transmission shaft 47. When the third main switching unit 33 is in the other of the opposite positions, the power transmitted to the gear 44 is transmitted to the transmission shaft 47.

The auxiliary transmission unit 12 includes a creep unit 50, a first auxiliary switching unit 51, and a second auxiliary switching unit 52. The creep unit 50 is connected to the transmission shaft 47, and is shiftable among two opposite positions by the movement of a shifter. In the case where the creep unit 50 is in one of the opposite positions, the power from the transmission shaft 47 is transmitted via the shifter to the transmission shaft 57. In the case where the creep unit 50 is in the other of the opposite positions, the power from the transmission shaft 47 is transmitted via the gears 53 to 56 to the transmission shaft 57. That is, when the creep unit 50 is in one of the opposite positions, the rotation of the transmission shaft 47 is transmitted to the transmission shaft 57 without reduction. When the creep unit 50 is in the other of the opposite positions, the rotation of the transmission shaft 47 is reduced via the gears 53 to 56 and is transmitted to the transmission shaft 57.

The first auxiliary switching unit 51 includes: a shifter 61 which rotates together with the transmission shaft 57 and which is movable along an axial direction; and a gear 62 which is rotatable relative to the transmission shaft 57. In the first auxiliary switching unit 51, when the shifter 61 has been moved to shift to one of the opposite positions (high-speed position) and the shifter 61 has engaged with a rotating body 67, the power from the transmission shaft 57 is transmitted to an output shaft 66 via gears 62, 63, 64, and 65. Note that the gears 63 and 64 are rotatable together with a transmission shaft 80, and the gear 65 is rotatable together with the output shaft 66.

The second auxiliary switching unit 52 includes gears 71, 72, 74, 76, and 77, rotating bodies 73 and 78, a transmitting body 75, and a shifter 79. The gear 71 rotates together with the transmission shaft 57. The gear 72 meshes with the gear 71. The rotating body 73 rotates together with the gear 72. The gear 74 is provided on the rotating body 73 and rotates together with the rotating body 73. The transmitting body 75 rotates relative to the transmission shaft 57, and rotates together with the gear 74. The gear 76 rotates together with the transmitting body 75. The gear 77 meshes with the gear 76. The rotating body 78 rotates as the gear 77 rotates. The shifter 79 rotates together with the transmission shaft 80 and is movable along the axial direction of the shifter 79.

When the shifter 79 has been moved to shift to one of the opposite positions (low-speed position: first slowdown position L) from a neutral position N and the shifter 79 has meshed with the rotating body 73, the power from the transmission shaft 57 is transmitted to the transmission shaft 80 via the gears 71 and 72 and the shifter 79. When the shifter 79 has been moved to shift to the other of the opposite positions (medium-speed position: second slowdown position M) from the neutral position N and the shifter 79 has meshed with the rotating body 78, the power from the transmission shaft 57 is transmitted to the transmission shaft 80 via the gears 71 and 72, the rotating body 73, the gear 74, the transmitting body 75, the gears 76 and 77, the rotating body 78, and the shifter 79.

Thus, the speed at which the transmission shaft 57 is rotated by the power transmitted from the prime mover 8 is switched by the auxiliary transmission unit 12 to high speed (high-speed stage), medium speed (medium-speed stage), or low speed (low-speed stage), and the power transmitted to the transmission shaft 57 is transmitted to a rear wheel differential via the output shaft 66. The rear wheel differential is a device to rotate the rear wheels 7R.

The PTO power transmission unit 13 includes a PTO rotation shaft 27, a switching mechanism 28, and a PTO shaft 29. The PTO rotation shaft 27 receives the power transmitted from the transmission shaft 20. The switching mechanism 28 switches between a state in which the switching mechanism 28 transmits the power from the PTO rotation shaft 27 and a state in which the switching mechanism 28 does not transmit the power from the PTO rotation shaft 27. The PTO shaft 29 receives the power transmitted from the switching mechanism 28. Thus, with the PTO power transmission unit 13, the power from the prime mover 8 is transmitted via the PTO rotation shaft 27 and the switching mechanism 28 to the PTO shaft 29.

The front wheel power transmission unit 14 includes a transmission shaft 18 and a switching mechanism 19. The transmission shaft 18 receives the power transmitted from the output shaft 66 via gears. The power acting on the transmission shaft 18 is transmitted by the switching mechanism 19 toward the front wheels.

Figure 2:
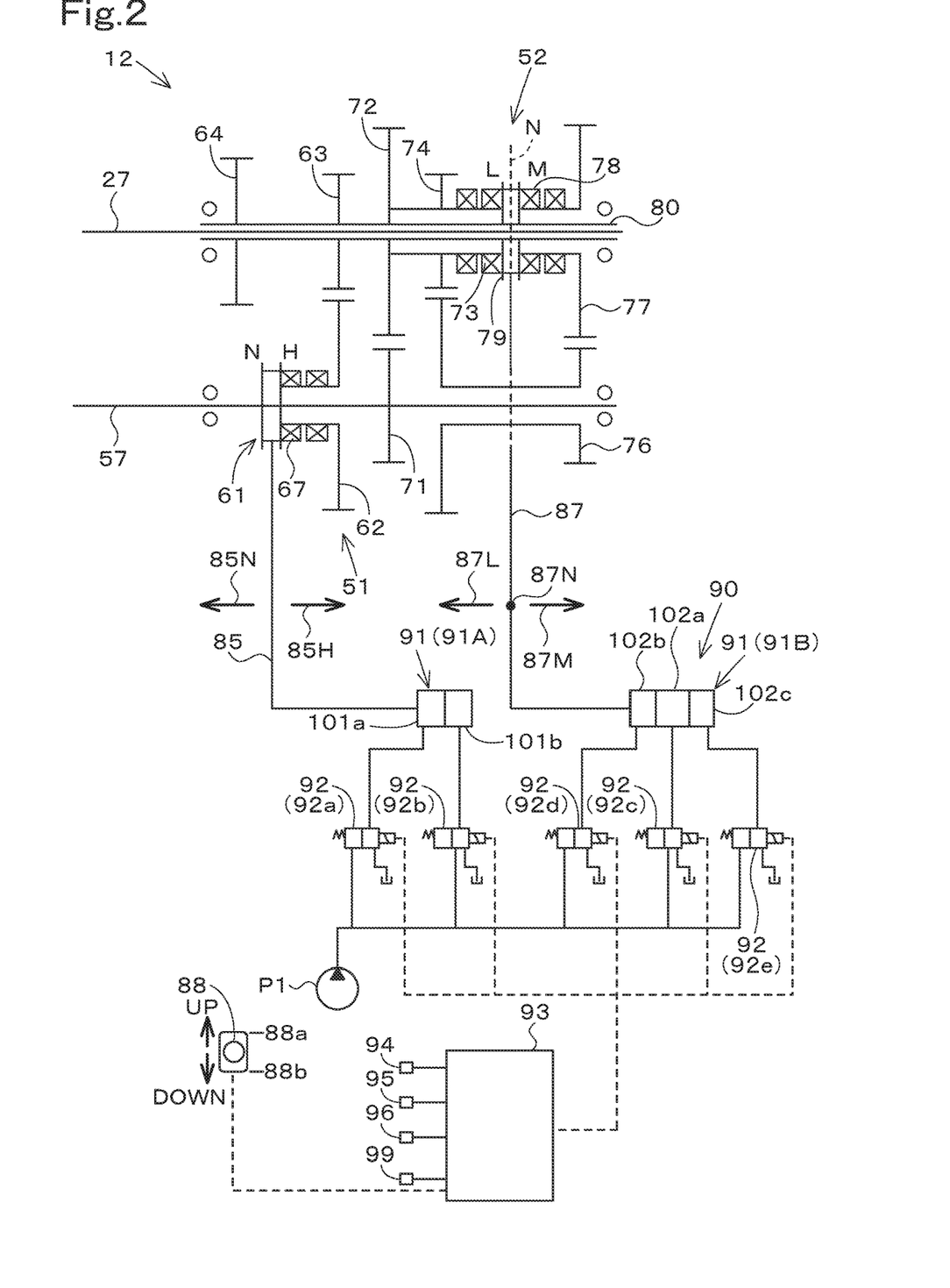
FIG. 2 illustrates an auxiliary transmission unit and a speed change restraint unit.

As illustrated in FIG. 2, the tractor 1 includes a control device 93. The control device 93 has connected thereto an operation member 88, with which an operator manually performs a speed change operation. The operation member 88 is a lever, a switch, or the like provided near the operator's seat 9, and is shiftable between a speedup position 88a and a slowdown position 88b.

When the operation member 88 has been operated to move from a neutral position to the speedup position 88a (shifting up operation has been performed), the auxiliary transmission unit 12 performs a speed change process to increase speed (speed increasing process).

For example, when the auxiliary transmission unit 12 is in its medium-speed stage, the operation member 88 is operated to move from the neutral position to the speedup position 88a (shifting up operation is performed). With this, a linkage member (shift fork) 87 fitted on the shifter 79 of the second auxiliary switching unit 52 moves from a medium-speed position (third position) 87M to a neutral position (first position) 87N, and a linkage member (shift fork) 85 fitted on the shifter 61 of the first auxiliary switching unit 51 moves from a neutral position 85N to a high-speed position 85H, thereby shifting the shifter 61 to the high-speed position H (high-speed stage) and shifting the auxiliary transmission unit 12 from medium-speed stage to high-speed stage.

When the operation member 88 has been operated to move from the neutral position to the speedup position 88a (shifting up operation has been performed) while the auxiliary transmission unit 12 is in its low-speed stage, the linkage member (shift fork) 87 moves from a low-speed position (second position) 87L to the medium-speed position (third position) 87M, thereby shifting the shifter 79 to the medium-speed position M (medium-speed stage) and shifting the auxiliary transmission unit 12 from low-speed stage to medium-speed stage.

When the operation member 88 has been operated to move from the neutral position to the slowdown position 88b (shifting down operation has been performed), the auxiliary transmission unit 12 performs a speed change process to reduce speed (speed reducing process).

For example, when the auxiliary transmission unit 12 is in its high-speed stage, the operation member 88 is operated to move from the neutral position to the slowdown position 88b (shifting down operation is performed). With this, the linkage member (shift fork) 85 moves from the high-speed position 85H to the neutral position 85N, and the linkage member (shift fork) 87 moves from the neutral position (first position) 87N to the medium-speed position (third position) 87M, thereby shifting the shifter 79 to the medium-speed position M and shifting the auxiliary transmission unit 12 from high-speed stage to medium-speed stage.

When the operation member 88 has been operated to move from the neutral position to the slowdown position 88b (shifting down operation has been performed) while the auxiliary transmission unit 12 is in its medium-speed stage, the linkage member (shift fork) 87 moves from the medium-speed position (third position) 87M to the low-speed position (second position) 87L, thereby shifting the shifter 79 to the low-speed position L and shifting the auxiliary transmission unit 12 from high-speed stage to medium-speed stage.

As illustrated in FIG. 2, the tractor 1 includes a speed change restraint unit 90. The speed change restraint unit 90 is configured such that, during a speed change process performed by the transmission device 5, when an increase in speed of the vehicle body 3 has become equal to or greater than a threshold, the speed change restraint unit 90 stops the speed change process performed by the transmission device 5. Specifically, the speed change restraint unit 90 is configured such that, when the speed change process performed by the transmission device 5 is a speed change process to reduce the speed of the vehicle body 3 and the increase in speed after the start of the speed change process has become equal to or greater than the threshold, the speed change restraint unit 9 stops the speed change process.

The following description discusses the speed change restraint unit 90 in detail.

The speed change restraint unit 90 includes a plurality of movement mechanisms 91, solenoid valves 92, and the control device 93.

Each of the plurality of the movement mechanisms 91 is a mechanism configured to move the linkage members (shift forks) 85 and 87 using the pressure of hydraulic fluid. In the present embodiment, the plurality of movement mechanisms 91 include a first movement mechanism 91A and a second movement mechanism 91B.

The first movement mechanism 91A includes a cylinder shiftable between a neutral position 101a and a high-speed position 101b. The first movement mechanism 91A (cylinder) is linked to the linkage member (shift fork) 85. The neutral position 101a corresponds to the neutral position 85N of the linkage member 85. The high-speed position 101b corresponds to the high-speed position 85H of the linkage member 85.

The second movement mechanism 91B includes a shift cylinder shiftable among the following positions: a neutral position (stop position) 102a, a low-speed position (one position) 102b, and a medium-speed position (another position) 102c on the opposite side of the neutral position 102a from the low-speed position 102b. The second movement mechanism 91B is linked to the linkage member (shift fork) 87. The neutral position (stop position) 102a corresponds to the neutral position (first position) 87N of the linkage member 87. The low-speed position (one position) 102b corresponds to the low-speed position (second position) 87L of the linkage member 87. The medium-speed position (another position) 102c corresponds to the medium-speed position (third position) 87M of the linkage member 87.

The shifter 79 is shifted from the neutral position N to the low-speed position (first slowdown position) L while the transmission device 5 is in its medium-speed stage. In so doing, in the case where the speed of the vehicle body 3 is equal to or greater than a threshold, the second movement mechanism 91B moves the linkage member 87 from the low-speed position (second position) 87L to the neutral position (first position) 87N. The shifter 79 is shifted from the neutral position N to the medium-speed position (second slowdown position) M while the transmission device 5 is in its high-speed stage. In so doing, in the case where the speed of the vehicle body 3 is equal to or greater than a threshold, the second movement mechanism 91B moves the linkage member 87 from the medium-speed position (third position) 87M to the neutral position (first position) 87N.

Each solenoid valve 92 is a valve which allows supply of hydraulic fluid to a corresponding movement mechanism 91 when it is open and which is connected to the movement mechanism 91 via a fluid passage. Specifically, the solenoid valves 92 include a first switching valve 92a, a second switching valve 92b, a third switching valve 92c, a fourth switching valve 92d, and a fifth switching valve 92e.

The first switching valve 92a is configured such that, when a solenoid thereof is energized by a control signal inputted from the control device 93, the first switching valve 92a allows supply of hydraulic fluid discharged from a hydraulic pump P1 to the first movement mechanism 91A, thereby shifting the first movement mechanism 91A to the neutral position 11a.

The second switching valve 92b is configured such that, when a solenoid thereof is energized by a control signal inputted from the control device 93, the second switching valve 92b allows supply of hydraulic fluid discharged from the hydraulic pump P1 to the first movement mechanism 91A, thereby shifting the first movement mechanism 91A to the high-speed position 101b.

The third switching valve 92c is configured such that, when a solenoid thereof is energized by a control signal inputted from the control device 93, the third switching valve 92c allows supply of hydraulic fluid discharged from the hydraulic pump P1 to the second movement mechanism 91B, thereby shifting the second movement mechanism 91B to the neutral position (stop position) 102a.

The fourth switching valve 92d is configured such that, when a solenoid thereof is energized by a control signal inputted from the control device 93, the fourth switching valve 92d allows supply of hydraulic fluid discharged from the hydraulic pump P1 to the second movement mechanism 91B, thereby shifting the second movement mechanism 91B to the low-speed position (one position) 102b.

The fifth switching valve 92e is configured such that, when a solenoid thereof is energized by a control signal inputted from the control device 93, the fifth switching valve 92e allows supply of hydraulic fluid discharged from the hydraulic pump P1 to the second movement mechanism 91B, thereby shifting the second movement mechanism 91B to the medium-speed position (another position) 102c.

The control device 93 performs various types of controls concerning the tractor 1. The control device 93 has connected thereto: an operation detection device 94 configured to detect speed change operations; a speed change detection device 95 to detect speed change; and an increase-in-speed detection device 96 to detect an increase in speed of the vehicle body 3.

The operation detection device 94 is a sensor to detect a speed change operation performed with the operation member 88. In the case where the operation member 88 has been operated to move from the neutral position to the speedup position 88a, the operation detection device 94 detects that the operation member 88 has been operated to increase speed (shifting up operation has been performed). In the case where the operation member 88 has been operated to move from the neutral position to the slowdown position 88b, the operation detection device 94 detects that the operation member 88 has been operated to reduce speed (shifting down operation has been performed).

The increase-in-speed detection device 96 is a sensor configured to detect at least one of the following: the number of rotations of the front wheels 7F: the number of rotations of the rear wheels 7R; the number of rotations of a front axle on which the front wheels 7F are rotatably supported; and the number of rotations of a rear axle on which the rear wheels 7R are rotatably supported. The increase-in-speed detection device 96 convers the number of rotations of the front wheels 7F, the number of rotations of the rear wheels 7R, the number of rotations of the front axle, and/or the number of rotations of the rear axle into the speed of the vehicle body 3. Then, the increase-in-speed detection device 96 calculates a difference in vehicle speed between the speed of the vehicle body 3 at the start of a speed change process and the current speed of the vehicle body 3 after the start of the speed change process (such a difference in vehicle speed is an increase in speed).

The increase-in-speed detection device 96 retains the speed of the vehicle body 3 at the point in time in which the auxiliary transmission unit 12 was in its high-speed stage (high-speed position H) and in which speed change (speed change process) from the high-speed position H to the medium-speed position (second slowdown position) M was started (such a speed is "vehicle speed at the start of the speed change process"), and detects an increase in speed of the vehicle body 3 from the difference between the vehicle speed at the start of the speed change process and the current speed of the vehicle body 3 after the start of the speed change process (such a difference is "difference in vehicle speed").

The increase-in-speed detection device 96 retains the speed of the vehicle body 3 at the point in time in which the auxiliary transmission unit 12 was in its medium-speed stage (medium-speed position M) and in which speed change (speed change process) from the medium-speed position M to the low-speed position (first slowdown position) L was started (such a speed is "vehicle speed at the start of the speed change process"), and detects an increase in speed of the vehicle body 3 from the difference between the vehicle speed at the start of the speed change process and the current speed of the vehicle body 3 after the start of the speed change process (such a difference is "difference in vehicle speed").

The speed change detection device 95 is, for example, a sensor to detect speed change performed by the transmission device 5. Specifically, the speed change detection device 95 detects whether speed change has been performed by the engagement between the shifter 61 or 79 and the rotating body 67, 73, or 78. When the shifter 61 has come into engagement with the rotating body 67, the speed change detection device 95 detects that a change to high-speed stage has been made (a change to high-speed stage has been completed). When the shifter 79 has come into engagement with the rotating body 73, the speed change detection device 95 detects that a change to low-speed stage has been made (a change to low-speed stage has been completed). When the shifter 79 has come into engagement with the rotating body 78, the speed change detection device 95 detects that a change to medium-speed stage has been made (a change to medium-speed stage has been completed).

When the operation detection device 94 has detected a shifting down operation while the auxiliary transmission unit 12 was in its high-speed stage (such an operation is "first slowing down operation"), the control device 93 starts the following speed change process (first speed change process): the control device 93 outputs a control signal to the first switching valve 92a to shift the shifter 61 from the high-speed position H to the neutral position N; and outputs a control signal to the fifth switching valve 92e to shift the shifter 79 from the neutral position N to the medium-speed position M. During the first speed change process involving shifting from the high-speed position H to the medium-speed position M as such, the control device 93 refers to an increase in speed detected by the increase-in-speed detection device 96 after the start of the speed change process (first speed change process), and, when the increase in speed has become equal to or greater than a threshold, the control device 93 stops the first speed change process and performs a return process involving outputting a control signal to the second switching valve 92b and the third switching valve 92c to change the speed stage of the auxiliary transmission unit 12 back to high-speed stage.

When the operation detection device 94 has detected a shifting down operation while the auxiliary transmission unit 12 was in its medium-speed stage (such an operation is "second slowing down operation"), the control device 93 starts the following speed change process (second speed change process): the control device 93 outputs a control signal to the third switching valve 92c and then outputs a control signal to the fourth switching valve 92d to shift the shifter 79 to the low-speed position L through the medium-speed position M and the neutral position N. During the second speed change process involving shifting from the medium-speed position M to the low-speed position L as such, the control device 93 refers to an increase in speed detected by the increase-in-speed detection device 96 after the start of the speed change process, and, when the increase in speed has become equal to or greater than a threshold, the control device 93 stops the second speed change process and performs a return process involving outputting a control signal to the fifth switching valve 92e to change the speed stage of the auxiliary transmission unit 12 back to medium-speed stage.

As illustrated in FIG. 2, the tractor 1 includes a notification device 99. The notification device 99 is, for example, a monitor, a speaker, and/or the like, and provides a notification of the speed change status of the transmission device 5. The notification device 99 is provided near the operator's seat 9, allowing the operator to understand the speed change status of the transmission device 5. When speed change by the operation of the operation member 88 has been received (i.e., when the operation detection device 94 has detected the operation of changing speed stages), the notification device 99 provides a notification indicating that the speed change has been received, via, for example, sound outputted from the speaker and/or a symbol displayed on the monitor. After the receipt of the speed change, when the speed change process has been stopped as described earlier, the notification device 99 provides a notification indicating that the speed change has been canceled, via sound outputted from the speaker and/or a symbol displayed on the monitor. Furthermore, in the case where the speed change has been canceled but the speed stage of the auxiliary transmission unit 12 has not been changed back to the original speed stage, the notification device 99 provides a notification indicating that the speed stage has not been changed back to the original speed stage, via, for example, sound outputted from the speaker and/or a symbol displayed on the monitor.

Figure 3:
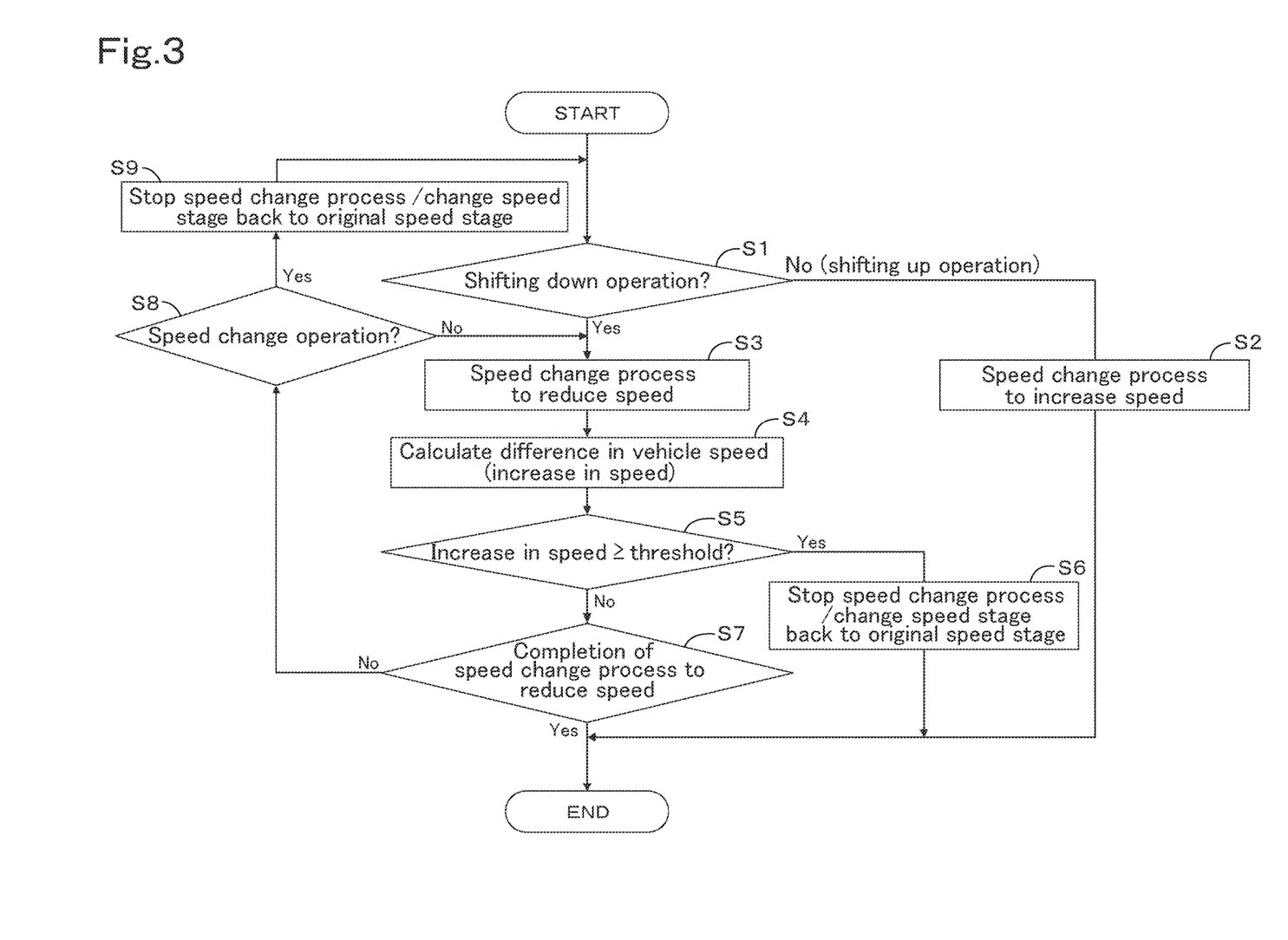
FIG. 3 shows a flow of how a control device operates at the time of speed change restraint.

FIG. 3 shows a flow of how the control device 93 operates at the time of speed change restraint.

As shown in FIG. 3, the control device 93 determines whether or not the operation detection device 94 has detected a speed change operation to reduce speed (slowing down operation, or shifting down operation) (S1). For example, the control device 93 determines whether or not the operation detection device 94 has detected the operation of changing the speed stage from high-speed stage to medium-speed stage (first slowing down operation) or the operation of changing the speed stage from medium-speed stage to low-speed stage (second slowing down operation).

In the case where the operation detection device 94 has not detected a shifting down operation, i.e., in the case where the operation detection device 94 has detected a shifting up operation (No in S1), the control device 93 performs a speed change process to increase speed (S2). For example, in the case of shifting up from medium-speed stage, the control device 93 outputs a control signal to the second switching valve 92b and the third switching valve 92c to shift the shifter 79 to the neutral position N and shift the shifter 61 to the high-speed position H. Alternatively, in the case of shifting up from low-speed stage, the control device 93 outputs a control signal to the fifth switching valve 92e to shift the shifter 79 to the medium-speed position M.

In the case where the operation detection device 94 has detected a shifting down operation (Yes in S1), i.e., in the case where the operation detection device 94 has detected a first slowing down operation (shifting down from high-speed stage to medium-speed stage) or a second slowing down operation (shifting down from medium-speed stage to low-speed stage), the control device 93 performs a speed change process to reduce speed (S3).

For example, in the case of shifting down from high-speed stage, the control device 93 starts a speed change process (first speed change process) involving: outputting a control signal to the first switching valve 92a and the fifth switching valve 92e to shift the shifter 61 to the neutral position N and switch the shifter 79 to the medium-speed position M. In the case of shifting down from medium-speed stage, the control device 93 starts a speed change process (second speed change process) involving outputting a control signal to the fourth switching valve 92d to shift the shifter 79 to the low-speed position L.

The control device 93 retains the speed of the vehicle body 3 at the point in time in which the first speed change process or second speed change process was started (such a speed is "vehicle speed at the start of the first speed change process" or "vehicle speed at the start of the second speed change process"), and determines a difference in vehicle speed (increase in speed of the vehicle body 3) between the retained vehicle speed and the current speed of the vehicle body 3 (S4). Then, the control device 93 determines whether or not the increase in speed of the vehicle body 3 is equal to or greater than a threshold (S5). During the first speed change process, when the increase in speed of the vehicle body 3 has become equal to or greater than a threshold (Yes in S5), the control device 93 stops the first speed change process and changes the speed stage back to the speed stage before the first speed change process (performs a return process involving changing the speed stage back to the original speed stage) (S6). During the second speed change process, when the increase in speed of the vehicle body 3 has become equal to or greater than a threshold (Yes in S5), the control device 93 stops the second speed change process and changes the speed stage back to the speed stage before the second speed change process (performs a return process involving changing the speed stage back to the original speed stage) (S6).

For example, in the case where, during the first speed change process, the difference in vehicle speed between the speed of the vehicle body 3 at the start of the first speed change process and the current speed of the vehicle body 3 is equal to or greater than 5.0 km (threshold) (i.e., when the increase in speed of the vehicle body 3 has become equal to or greater than 5.0 km), the control device 93 stops outputting the control signal to the first switching valve 92a and the fifth switching valve 92e to stop the first speed change process, and outputs a control signal to the second switching valve 92b and the third switching valve 92c to change the speed stage back to the original speed stage.

Alternatively, in the case where, during the second speed change process, the difference in vehicle speed between the speed of the vehicle body 3 at the start of the second speed change process and the current speed of the vehicle body 3 is equal to or greater than 1.0 km (threshold) (i.e., when the increase in speed of the vehicle body 3 has become equal to or greater than 1.0 km), the control device 93 stops outputting the control signal to the fourth switching valve 92d to stop the second speed change process, and outputs a control signal to the fifth switching valve 92e to change the speed stage back to the original speed stage.

In the case where the increase in speed of the vehicle body 3 is less than the threshold (No in S5), the control device 93 refers to the state of detection by the speed change detection device 95, and, in the case where the control device 93 has recognized the completion of shifting down from high-speed stage to medium-speed stage (completion of the speed change process) or the completion of shifting down from medium-speed stage to low-speed stage (completion of the speed change process) (Yes in S7), the control device 93 ends the speed change (shifting down) process. If the control device 93 has recognized incompletion of the speed change (shifting down) process (No in S7), the control device 93 determines whether or not a speed change operation (shifting up operation, shifting down operation) was performed during the speed change process (S8).

In the case where the speed change operation has been performed (Yes in S8), if the process during which the speed change operation was performed in S8 is the first speed change process (if the speed change process in the case of "No" in S7 is the first speed change process), the control device 93 stops the first speed change process and changes the speed stage back to the speed stage before the first speed change process (return process involving changing the speed stage back to the original speed stage). If the process during which the speed change operation was performed in S8 is the second speed change process (if the speed change process in the case of "No" in S7 is the second speed change process), the control device 93 stops the second speed change process and changes the speed stage back to the speed stage before the second speed change process (return process involving changing the speed stage back to the original speed stage) (S9: stop the speed change process and change the speed stage back to the original speed stage). Then, the control device 93 returns processing to S1.

In the case where no speed change operation was performed during the speed change process (No in S8), the control device 93 returns processing to S3 to continue the speed change process to reduce speed. Note that the control device 93 returns processing to S1 also in the case where a speed change operation is performed in any of the steps S3 to S6.

In the above-described embodiment, the first speed change process is started regardless of the speed of the vehicle body 3; however, the following configuration may be employed instead: the control device 93 starts the first speed change process when the speed of the vehicle body 3 is equal to or less than a first upper limit and the first slowing down operation has been detected; and the control device 93 does not start the first speed change process when the speed of the vehicle body 3 has exceeded the first upper limit. The following configuration may also be employed: the control device 93 starts the second speed change process when the vehicle speed is equal to or less than a second upper limit and the second slowing down operation has been detected; and the control device 93 does not start the second speed change process when the vehicle speed has exceeded the second upper limit. Note that the first upper limit is set to be greater than the second upper limit.

A working vehicle 1 comprises: a vehicle body 3; a linkage device 4 configured to link a working device 2 to the vehicle body 3; a prime mover 8 provided on the vehicle body 3; a traveling device 7 configured to cause the vehicle body 3 to travel; a transmission device 5 configured to transmit power from the prime mover 8 to the traveling device 7 and perform a speed change process to change a speed of the vehicle body 3; an increase-in-speed detection device 96 configured to detect an increase in speed of the vehicle body 3; and a speed change restraint unit 90 configured such that, during the speed change process performed by the transmission device 5, when the increase in speed detected by the increase-in-speed detection device 96 has become equal to or greater than a threshold, the speed change restraint unit 90 stops the speed change process performed by the transmission device 5. This achieves the following: for example, in the case where the working vehicle 1 is traveling down a slope with a towed working device 2 such as a trailer, when the speed change process has been started by the transmission device 5 and the vehicle body 3 has accelerated, it is possible to stop the speed change process and stably tow the working device 2 such as a trailer.

The speed change restraint unit 90 is configured such that, when the speed change process performed by the transmission device 5 is a speed change process to reduce the speed of the vehicle body 3 and the increase in speed after a start of the speed change process has become equal to or greater than the threshold, the speed change restraint unit 90 stops the speed change process. This achieves the following: under the circumstances in which the working vehicle 1 is traveling down a slope with a towed working device 2 such as a trailer, in the case where the speed change process to reduce the speed of the vehicle body 3 would result in acceleration of the vehicle body 3, the speed change process is stopped and thereby the working vehicle 1 is prevented from being pushed forward by the trailer or the like.

The increase-in-speed detection device 96 is configured to calculate, as the increase in speed, a difference in vehicle speed between a speed of the vehicle body 3 at the start of the speed change process and a current speed of the vehicle body 3 after the start of the speed change process. This makes it possible to easily determine an increase in speed of the vehicle body 3.

The transmission device 5 includes a device configured to select a speed stage among multiple speed stages by movement of a shifter 61 or 79; and the speed change restraint unit 90 is configured to stop the speed change process by moving a linkage member 85 or 87 in a direction opposite to a direction in which the linkage member 85 or 87 has been moved by the movement of the shifter 61 or 79, the linkage member 85 or 87 being a member linked to the shifter 61 or 79. This achieves the following: in the case where the time taken for speed change by the shifter 61 or 79 is relatively long, when the vehicle body 3 would accelerate, the speed change process is stopped and thereby stable travel is achieved.

The linkage member 87 is shiftable among a first position 87N for maintaining the shifter 79 in a neutral position N, a second position 87L for maintaining the shifter 79 in a first slowdown position L, and a third position 87M for maintaining the shifter 79 in a second slowdown position M; and the speed change restraint unit 90 includes a movement mechanism 91 (91B) configured to: move the linkage member 87 from the second position 87L to the first position 87N when the shifter 79 is in the first slowdown position L; and move the linkage member 87 from the third position 87M to the first position 87N when the shifter 79 is in the second slowdown position M. This achieves the following: in the case where at least two types of speed reduction are performed by changing the position of the linkage member 87 (speed reduction by changing the position of the linkage member 87 to the first slowdown position L, and speed reduction by changing the position of the linkage member 87 to the second slowdown position M), it is possible to quickly cancel the speed change process.

The movement mechanism 91 (91B) is shiftable among a stop position 102a, one position 102b, and another position 102c on the opposite side of the stop position 120a from the one position 102b, the stop position 102a corresponding to the first position 87N of the linkage member 87, the one position 102b corresponding to the second position 87L of the linkage member 87, the other position 102c corresponding to the third position 87M of the linkage member 87; and the speed change restraint unit 90 includes: a solenoid valve 92 configured to shift the movement mechanism 91 (91B) to the stop position 102a, the one position 102b, or the other position 102c using hydraulic fluid; and a control device 93 configured or programmed to control the solenoid valve 92. This achieves the following: the control device 93 controls the solenoid valve 92 to shift the movement mechanism 91 (91B) from the one position 102b to the stop position 102a or from the other position 102c to the stop position 102a, thereby making it possible to quickly stop the speed reduction with the shifter 79.

The control device 93 is configured or programmed such that, when the increase in speed after the start of the speed change process has become equal to or greater than the threshold, the control device 93 controls the solenoid valve 92 to move the movement mechanism 91 (91B) to the stop position 102a. This makes it possible to smoothly move the movement mechanism 91 (91B) to the stop position 102a with the solenoid valve 92.

The speed change restraint unit 90 is configured such that, when the increase in speed has become equal to or greater than the threshold, the speed change restraint unit 90 stops the speed change process performed by the transmission device 5 and then changes a speed stage of the transmission device 5 back to a speed stage before the start of the speed change process. This makes it possible to eliminate or reduce the likelihood that the vehicle body 3 will accelerate at the time of speed change, and possible to achieve more stable travel.

The transmission device 5 includes an auxiliary transmission unit 12 configured to select one of multiple speed stages. This allows the working vehicle 1 to travel stably even in the case where vehicle speed (speed) is adjusted while auxiliary speed change is performed or in the case where auxiliary speed change is performed according to the slope of an agricultural field or a road.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
a vehicle body;
a linkage device configured to link a working device to the vehicle body;
a prime mover provided on the vehicle body;
a traveling device configured to cause the vehicle body to travel;
a transmission device configured to be shifted to one of multiple speed stages, transmit power from the prime mover to the traveling device, and perform a speed change process to change a speed of the vehicle body;
an increase-in-speed detection device configured to detect an increase in speed of the vehicle body; and
a speed change restraint unit configured such that, during the speed change process performed by the transmission device, when the increase in speed detected by the increase-in-speed detection device has become equal to or greater than a threshold, the speed change restraint unit stops the speed change process performed by the transmission device and then performs a return process to change a speed stage of the transmission device back to a speed stage before the start of the speed change process, wherein
the transmission device includes a device configured to select a speed stage among the multiple speed stages by movement of at least one of shifters; and
the speed change restraint unit is configured to, when the increase in speed has become equal to or greater than the threshold during the speed change process performed by the transmission device, stop the speed change process and then perform the return process by moving at least one of linkage members in a direction opposite to a direction in which the at least one of the linkage members has been moved by the movement of the at least one of the shifters, the linkage members being members linked to the shifters.

2. The working vehicle according to claim 1, wherein the speed change restraint unit is configured such that, when the speed change process started by the transmission device is a speed change process to reduce the speed of the vehicle body and when the increase in speed after a start of the speed change process has become equal to or greater than the threshold, the speed change restraint unit stops the speed change process and then performs the return process.

3. The working vehicle according to claim 2, wherein the increase-in-speed detection device is configured to calculate, as the increase in speed, a difference in vehicle speed between a speed of the vehicle body at the start of the speed change process and a current speed of the vehicle body after the start of the speed change process.

4. The working vehicle according to claim 3, wherein:
a second linkage member which is one of the linkage members is linked to a second shifter which is one of the shifters and is shiftable among a first position for maintaining the second shifter in a neutral position, a second position for maintaining the second shifter in a first slowdown position, and a third position for maintaining the second shifter in a second slowdown position; and
the speed change restraint unit includes a second movement mechanism configured to:
move the second linkage member from the second position to the first position when the increase in speed has become equal to or greater than the threshold during a second speed change process to shift the second shifter to the first slowdown position; and
move the second linkage member from the third position to the first position when the increase in speed has become equal to or greater than the threshold during a first speed change process to shift the second shifter to the second slowdown position.

5. The working vehicle according to claim 4, wherein:
a first linkage member which is the other of the linkage members is linked to a first shifter which is the other of the shifters and is shiftable between a neutral position and a high-speed position to shift the first shifter to a high-speed position;
the speed change restraint unit includes a first movement mechanism shiftable between a neutral position corresponding to the neutral position of the first linkage member and a high-speed position corresponding to the high-speed position of the first linkage member;
the second movement mechanism is shiftable among a stop position, one position, and another position on the opposite side of the stop position from the one position, the stop position corresponding to the first position of the second linkage member, the one position corresponding to the second position of the second linkage member, the other position corresponding to the third position of the second linkage member; and
the speed change restraint unit includes solenoid valves and a control device;
the solenoid valves include
a first switching valve to shift the first movement mechanism to the neutral position using hydraulic fluid,
a second switching valve to shift the first movement mechanism to the high-speed position using hydraulic fluid,
a third switching valve to shift the second movement mechanism to the stop position using hydraulic fluid,
a fourth switching valve to shift the second movement mechanism to the one position using hydraulic fluid, and
a fifth switching valve to shift the second movement mechanism to the other position using hydraulic fluid; and
the control device is configured or programmed to control positions of the first to fifth switching valves.

6. The working vehicle according to claim 5, wherein:
the transmission device includes an auxiliary transmission unit configured to select one of the following speed stages: a high-speed stage; a medium-speed stage; and a low-speed stage; and
the control device is configured or programmed such that when the increase in speed has become equal to or greater than the threshold during the first speed change process involving shifting the first shifter from the high-speed position to the neutral position and shifting the second shifter from the neutral position to the second slowdown position to shift the auxiliary transmission unit from the high-speed stage to the medium-speed stage, the control device stops outputting a control signal to the first switching valve and the fifth switching valve to stop the first speed change process and outputs a control signal to the second switching valve and the third switching valve to perform the return process to change a speed stage of the auxiliary transmission unit back to the high-speed stage, and when the increase in speed has become equal to or greater than the threshold during the second speed change process involving shifting the second shifter from the second slowdown position to the first slowdown position through the neutral position to shift the auxiliary transmission unit from the medium-speed stage to the low-speed stage, the control device stops outputting a control signal to the third switching valve and the fourth switching valve to stop the second speed change process and outputs a control signal to the fifth switching valve to perform the return process to change the speed stage of the auxiliary transmission unit back to the medium-speed stage.

7. The working vehicle according to claim 2, wherein:
a second linkage member which is one of the linkage members is linked to a second shifter which is one of the shifters and is shiftable among a first position for maintaining the second shifter in a neutral position, a second position for maintaining the second shifter in a first slowdown position, and a third position for maintaining the second shifter in a second slowdown position; and
the speed change restraint unit includes a second movement mechanism configured to:
move the second linkage member from the second position to the first position when the increase in speed has become equal to or greater than the threshold during a second speed change process to shift the second shifter to the first slowdown position; and
move the second linkage member from the third position to the first position when the increase in speed has become equal to or greater than the threshold during a first speed change process to shift the second shifter to the second slowdown position.

8. The working vehicle according to claim 7, wherein:
a first linkage member which is the other of the linkage members is linked to a first shifter which is the other of the shifters and is shiftable between a neutral position and a high-speed position to shift the first shifter to a high-speed position;
the speed change restraint unit includes a first movement mechanism shiftable between a neutral position corresponding to the neutral position of the first linkage member and a high-speed position corresponding to the high-speed position of the first linkage member;
the second movement mechanism is shiftable among a stop position, one position, and another position on the opposite side of the stop position from the one position, the stop position corresponding to the first position of the second linkage member, the one position corresponding to the second position of the second linkage member, the other position corresponding to the third position of the second linkage member; and
the speed change restraint unit includes solenoid valves and a control device;
the solenoid valves include
a first switching valve to shift the first movement mechanism to the neutral position using hydraulic fluid,
a second switching valve to shift the first movement mechanism to the high-speed position using hydraulic fluid,
a third switching valve to shift the second movement mechanism to the stop position using hydraulic fluid,
a fourth switching valve to shift the second movement mechanism to the one position using hydraulic fluid, and
a fifth switching valve to shift the second movement mechanism to the other position using hydraulic fluid; and
the control device is configured or programmed to control positions of the first to fifth switching valves.

9. The working vehicle according to claim 8, wherein:
the transmission device includes an auxiliary transmission unit configured to select one of the following speed stages: a high-speed stage; a medium-speed stage; and a low-speed stage; and
the control device is configured or programmed such that
when the increase in speed has become equal to or greater than the threshold during the first speed change process involving shifting the first shifter from the high-speed position to the neutral position and shifting the second shifter from the neutral position to the second slowdown position to shift the auxiliary transmission unit from the high-speed stage to the medium-speed stage, the control device stops outputting a control signal to the first switching valve and the fifth switching valve to stop the first speed change process and outputs a control signal to the second switching valve and the third switching valve to perform the return process to change a speed stage of the auxiliary transmission unit back to the high-speed stage, and
when the increase in speed has become equal to or greater than the threshold during the second speed change process involving shifting the second shifter from the second slowdown position to the first slowdown position through the neutral position to shift the auxiliary transmission unit from the medium-speed stage to the low-speed stage, the control device stops outputting a control signal to the third switching valve and the fourth switching valve to stop the second speed change process and outputs a control signal to the fifth switching valve to perform the return process to change the speed stage of the auxiliary transmission unit back to the medium-speed stage.

10. The working vehicle according to claim 1, wherein:
a second linkage member which is one of the linkage members is linked to a second shifter which is one of the shifters and is shiftable among a first position for maintaining the second shifter in a neutral position, a second position for maintaining the second shifter in a first slowdown position, and a third position for maintaining the second shifter in a second slowdown position; and
the speed change restraint unit includes a second movement mechanism configured to:
move the second linkage member from the second position to the first position when the increase in speed has become equal to or greater than the threshold during a second speed change process to shift the second shifter to the first slowdown position; and
move the second linkage member from the third position to the first position when the increase in speed has become equal to or greater than the threshold during a first speed change process to shift the second shifter to the second slowdown position.

11. The working vehicle according to claim 10, wherein:
a first linkage member which is the other of the linkage members is linked to a first shifter which is the other of the shifters and is shiftable between a neutral position and a high-speed position to shift the first shifter to a high-speed position;
the speed change restraint unit includes a first movement mechanism shiftable between a neutral position corresponding to the neutral position of the first linkage member and a high-speed position corresponding to the high-speed position of the first linkage member;
the second movement mechanism is shiftable among a stop position, one position, and another position on the opposite side of the stop position from the one position, the stop position corresponding to the first position of the second linkage member, the one position corresponding to the second position of the second linkage member, the other position corresponding to the third position of the second linkage member; and
the speed change restraint unit includes solenoid valves and a control device;
the solenoid valves include
 a first switching valve to shift the first movement mechanism to the neutral position using hydraulic fluid,
 a second switching valve to shift the first movement mechanism to the high-speed position using hydraulic fluid,
 a third switching valve to shift the second movement mechanism to the stop position using hydraulic fluid,
 a fourth switching valve to shift the second movement mechanism to the one position using hydraulic fluid, and
 a fifth switching valve to shift the second movement mechanism to the other position using hydraulic fluid; and
the control device is configured or programmed to control positions of the first to fifth switching valves.

12. The working vehicle according to claim 11, wherein:
the transmission device includes an auxiliary transmission unit configured to select one of the following speed stages: a high-speed stage; a medium-speed stage; and a low-speed stage; and
the control device is configured or programmed such that
 when the increase in speed has become equal to or greater than the threshold during the first speed change process involving shifting the first shifter from the high-speed position to the neutral position and shifting the second shifter from the neutral position to the second slowdown position to shift the auxiliary transmission unit from the high-speed stage to the medium-speed stage, the control device stops outputting a control signal to the first switching valve and the fifth switching valve to stop the first speed change process and outputs a control signal to the second switching valve and the third switching valve to perform the return process to change a speed stage of the auxiliary transmission unit back to the high-speed stage, and
 when the increase in speed has become equal to or greater than the threshold during the second speed change process involving shifting the second shifter from the second slowdown position to the first slowdown position through the neutral position to shift the auxiliary transmission unit from the medium-speed stage to the low-speed stage, the control device stops outputting a control signal to the third switching valve and the fourth switching valve to stop the second speed change process and outputs a control signal to the fifth switching valve to perform the return process to change the speed stage of the auxiliary transmission unit back to the medium-speed stage.

\* \* \* \* \*